(12) United States Patent
Allingham

(10) Patent No.: US 6,513,098 B2
(45) Date of Patent: Jan. 28, 2003

(54) METHOD AND APPARATUS FOR SCALABLE ERROR CORRECTION CODE GENERATION PERFORMANCE

(75) Inventor: Donald N. Allingham, Fort Collins, CO (US)

(73) Assignee: Adaptec, Inc., Milpitas, CA (US)

( * ) Notice: Subject to any disclaimer, the term of this patent is extended or adjusted under 35 U.S.C. 154(b) by 67 days.

(21) Appl. No.: 09/866,110

(22) Filed: May 25, 2001

(65) Prior Publication Data

US 2002/0178325 A1 Nov. 28, 2002

(51) Int. Cl.$^7$ .............................................. G06F 12/00
(52) U.S. Cl. ........................................... 711/114; 714/6
(58) Field of Search ....................... 711/111, 114; 714/6; 364/184; 710/1

(56) References Cited

U.S. PATENT DOCUMENTS

| | | | |
|---|---|---|---|
| 5,778,426 A | 7/1998 | DeKoning et al. | 711/122 |
| 5,831,393 A | 11/1998 | Hohenstein et al. | 714/52 |
| 5,975,738 A * | 11/1999 | DeKoning et al. | 364/184 |
| 6,023,754 A | 2/2000 | DuLac et al. | 712/33 |
| 6,161,165 A | 12/2000 | Solomon et al. | 711/114 |
| 6,185,697 B1 * | 2/2001 | Shiraishi | 714/6 |
| 6,397,267 B1 * | 5/2002 | Chong, Jr. | 710/1 |

* cited by examiner

*Primary Examiner*—Do Hyun Yoo
*Assistant Examiner*—Nasser Moazzami
(74) *Attorney, Agent, or Firm*—Sheridan Ross P.C.

(57) ABSTRACT

A scalable memory controller for use in connection with error correction code is provided. According to the invention, the channels of the controller are interconnected to a plurality of parity engines and associated cache memories using a switched fabric architecture. A processor is provided for allocating operations requiring access to the parity engines or cache memories. By providing multiple parity engines and cache memories, error correction syndrome values can be calculated in parallel. The performance of the controller can be selectively scaled by providing a greater or lessor number of parity engines and associated cache memories. Furthermore, by utilizing a switched fabric internal architecture, data transfers between the internal components of the controller can be conducted simultaneously.

21 Claims, 3 Drawing Sheets

METHOD AND APPARATUS FOR SCALABLE ERROR CORRECTION CODE GENERATION PERFORMANCE

FIELD OF THE INVENTION

The present invention relates to memory controllers. In particular, the present invention relates to memory controllers for use in connection with the generation of error correction code having scalable performance.

BACKGROUND OF THE INVENTION

Computer systems require reliable storage for large amounts of data. Often, redundant arrays of independent (or inexpensive) disks (RAID) devices are used to provide such storage. In general, RAID devices involve storing data on a plurality of hard disk drives. The use of RAID techniques increases the reliability and/or speed of data storage and retrieval. There are various schemes, or RAID levels, according to which a number of hard disk drives or other storage devices may be used in connection with the storage of data. One such scheme is known as RAID level 5 (or RAID 5).

RAID 5 is also known as distributed data guarding. In a RAID 5 array, parity data is spread across all of the drives in the array. RAID 5 systems are tolerant of single drive failures, and provide high performance by enabling read operations to be conducted simultaneously. A RAID 5 array requires at least three individual drives.

In connection with RAID 5 arrays, write operations have typically had significantly lower performance than read operations. In particular, because data taken from the array during read operations does not need to be processed, it can be passed through the system controller quickly. However, write data must be processed to produce parity information before that data is stored in the array.

In a typical RAID 5 controller, a parity engine, such as a hardware XOR engine, is provided to calculate the required parity information. During a write operation, a block of data is stored in cache memory, and a parity syndrome value is calculated by the XOR engine. The newly calculated syndrome value is also stored in the cache memory. The data and associated syndrome value are then available for storage in the array. Assuming no overhead, a write operation in connection with a RAID 5 array requires a bandwidth of $3n+2(n/d)$, where n is the number of bytes in a block of data and d is the number of data drives in the array. For example, assuming four data disks, a memory bandwidth of 800 MB/s can support a maximum full stripe write bandwidth of approximately 228 MB/s. If a partial stripe is written, additional steps are required, as the new syndrome value must be calculated from a combination of new data, old data, and old parity data. In a worst case scenario, where the number of bytes to be written is smaller than the full stripe size divided by the number of data disks, the operation requires a bandwidth of 9n, assuming no overhead. For example, a memory bandwidth of 800 MB/s can support a maximum partial stripe write bandwidth of 87 MB/s.

A RAID controller having a single parity engine and single associated cache memory must execute transactions in a sequential manner. That is, one write must be completed before another begins, increasing the latency associated with write operations. This increased latency in turn reduces the number of input/output operations that can be completed per second and limits the bandwidth available for RAID 5 write operations.

One conventional approach to improving the performance of a RAID 5 controller is to increase the bandwidth of the cache memory by increasing its frequency of operation. However, this approach has had limited success, because the interface that is external to the controller has been increasing in bandwidth faster than the bandwidth of the cache has been increasing. Therefore, the frequency of operation of the cache memory has become an even larger impediment to increased RAID controller performance, even though the bandwidth of such memory continues to increase.

Another approach to increasing the performance of RAID controllers is to add a second parity engine and associated cache memory in parallel with the first parity engine and cache memory. However, the provision of a second cache memory interface greatly increases the number of pins required on a chip implementing the controller. Furthermore, because data cannot be passed to and from multiple parity engines over the data bus of a conventional RAID controller simultaneously, performance can decrease as a result of adding parallel parity engines and memories to otherwise conventional RAID controllers.

Still other conventional methods for increasing the performance of RAID controllers include performing parity calculations on the fly, broadcasting writes to memory, caching data internally, or other techniques that may be able to reduce the number of accesses to memory required. However, such approaches promise, at best, minor improvements in the performance of a RAID 5 controller.

Therefore, it would be desirable to provide a method and an apparatus for use in connection with the generation of error correction code that removed or reduced the period of latency encountered during write operations. Furthermore, it would be advantageous to provide such a method and apparatus that was scalable to provide a desired level of performance, and that was inexpensive to implement and reliable in operation.

SUMMARY OF THE INVENTION

According to the present invention, a method and an apparatus for scalable error correction code generation performance are provided. The present invention generally allows the performance of a memory controller for use in connection with error correction code, such as a RAID 5 controller, to be configured to provide a desired level of performance. Specifically, by providing multiple internal parity engines and associated cache memories that are each separately addressable, the latency normally encountered during write operations is reduced or removed. More specifically, the method and apparatus of the present invention allows for parity calculations to be carried out in parallel. By increasing the number of parity engines and cache memories, the performance of the controller can be scaled to provide a desired level of performance.

According to one embodiment of the present invention, a controller is provided with a plurality of parity engines, with each parity engine having an associated cache memory. The parity engines are each separately connected to a switch, which is in turn separately connected to a plurality of channels. A processor is provided for coordinating the operations of the various controller components. The switch allows any of the channels to be interconnected to and thereby communicate with any of the parity engines at the same time that any of the other channels are interconnected to and in communication with any of the other parity engines. Accordingly, parity calculations and other operations involving accesses to the cache memories can be conducted in parallel.

According to another embodiment of the present invention, a write request is received from a host system at a channel of a controller. A processor analyzes the write request, and assigns the write operation to one of a plurality of parity engines and associated cache memories. After the data associated with the write operation has been received by the channel, the channel addresses that data to the assigned parity engine. A provided switch, in response to the address information received in connection with the data, routes the data to the assigned parity engine. Accordingly, a switched circuit type connection is established between the channel and the parity engine. Furthermore, according to this embodiment of the present invention, additional data received at the first channel, or at a second channel, can be directed to a second parity engine, again assigned by the processor, while the first parity engine and associated cache memory is processing the first write request. Therefore, the period of latency normally encountered while parity information is calculated with respect to the first block of data is avoided.

Additional advantages of the present invention will become readily apparent from the following discussion, particularly when taken together with the accompanying drawings.

DETAILED DESCRIPTION

Figure 1:
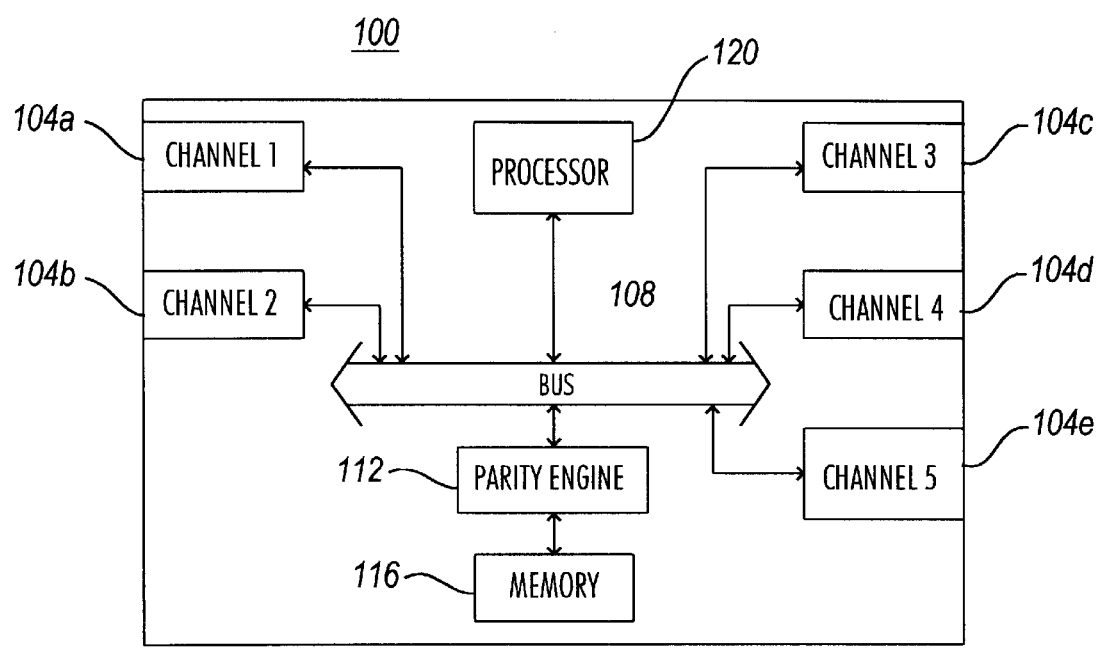
FIG. 1 depicts in functional block diagram form a RAID controller in accordance with the prior art.

With reference now to FIG. 1, a RAID controller 100 in accordance with the prior art is illustrated. In general, the RAID controller 100 provides a plurality of channels or interfaces 104a, 104b, 104c, 104d and 104e interconnected to one another by an internal bus 108. The prior art RAID controller 100 also includes a parity engine 112 and a cache memory 116. A processor 120 may also be provided. The parity engine 112 and associated cache memory 116, and the processor 120 are interconnected to one another and to the channels 104 by the internal bus 108.

In a typical implementation, a host system is interconnected to the controller 100 through one of the channels, for example, channel 1 104a. The remaining channels 104b–104e may each be interconnected to a storage device or plurality of storage devices. In response to a write request received from the host system at channel 1 104a, the processor 120 may direct channel 1 104a to provide the data to the parity engine 112 and cache memory 116. As can be appreciated, the use of an internal bus 108, such as a peripheral component interconnect (PCI) bus allows only one component of the controller 100 to transmit data over the bus 108 at a time. Therefore, while channel 1 104a is providing data to the parity engine 112 and the cache memory 116, none of the other channels 104b–104e or the processor 120 may have access to the bus 108. Furthermore, it will be appreciated that while the parity engine 112 is calculating parity data in connection with the data received from channel 1 104a, no other data may be passed to the parity engine 112. Accordingly, the processor 120, through the operation of software or firmware running on the processor 120, must allocate access to the parity engine 112 and the cache memory 116 in a sequential fashion. This results in delays in processing data during write operations, as described above in the Background of the Invention.

Figure 2:
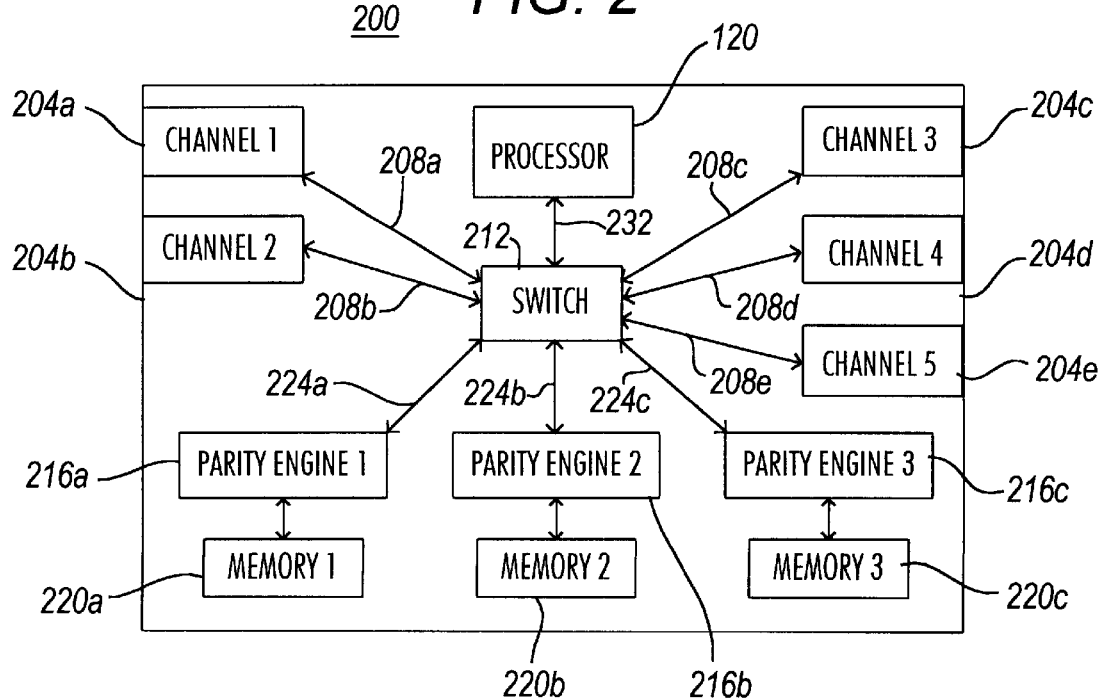
FIG. 2 depicts in functional block diagram form a RAID controller in accordance with an embodiment of the present invention.

With reference now to FIG. 2, a RAID controller 200 in accordance with an embodiment of the present invention is illustrated. In general, the RAID controller 200 includes a plurality of channels or interfaces 204a, 204b, 204c, 204d and 204e. The channels 204 generally interface the controller 200 to a computer or computers, and to a plurality of storage devices. Each of the channels 204a–204e has a signal or communication line 208a, 208b, 208c, 208d and 208e to interconnect the respective channel 204a–204e to a switch 212.

The RAID controller 200 additionally includes a plurality of parity engines 216a, 216b and 216c. The parity engines 216a–c are used to produce the data necessary to reconstruct data blocks through parity data or error correction code (ECC). Therefore, the parity engines 216a–c may include XOR engines. A cache memory 220a, 220b and 220c is associated with each of the parity engines 216a–216c. In addition, each of the parity engines 216a–216c is interconnected to the switch 212 by a signal or communication line 224a, 224b or 224c.

The controller 200 may also include a processor 228 for controlling and coordinating the activities of the various components of the controller 200. Software or firmware running on the processor 228 may be used to implement the control functions of the processor 228. The processor 228 is interconnected to the switch 212 by a signal or communication line 232.

It should be appreciated that the components of the controller 200 do not communicate with one another across a conventional bus. Instead, a switched fabric type architecture or topology is used. In particular, each of the enumerated components of the controller 200 is interconnected to the switch 212 by a dedicated signal line 208, 224, or 232. As a result, the switch 212 can establish a dedicated connection between, for example, any one channel 204 and any one parity engine 216. Therefore, data may be passed between different channels 204 and parity engines 216 simultaneously. In addition, the switched fabric architecture of the controller 200 allows data to be passed between any two channels 204, and allows the processor 228 to communicate with any of the channels 204 or parity engines 216. In particular, multiple simultaneous connections may be established. Accordingly, the switched fabric architecture allows operations such as data transfers, error correction syndrome value calculations, and the passing of control instructions between the processor 228 and the other components of the controller 200 to be conducted simultaneously.

The controller 200 of the present invention provides scalable performance in that a selected number of parity engines 216 and associated cache memories 220 can be provided. For instance, the controller 200 illustrated in FIG. 2 is shown as having three parity engines 216a, 216b and 216c. However, if the performance provided by the controller 200, configured as illustrated in FIG. 2 with three parity engines 216, was greater than necessary, but improved performance over a conventional memory controller 100 was desired, the memory controller 200 need only provide two parity engines (e.g., 216a and 216b) and their associated memories (e.g., 220a and 220b).

Alternatively, if greater performance than is available with three parity engines 216a–216c is desired, additional parity engines 216 and associated memories 220 can be added. In general, the number of additional parity engines 216 and cache memories 220 that can be added is limited only by the particular switched fabric architecture chosen for use in the controller 200. The particular switch 212 and processor 228 used in the controller 200 are preferably chosen so that their capabilities are in accordance with the scale (i.e. the number of parity engines 216 and associated cache memories 220) included in the controller 200.

Figure 3:
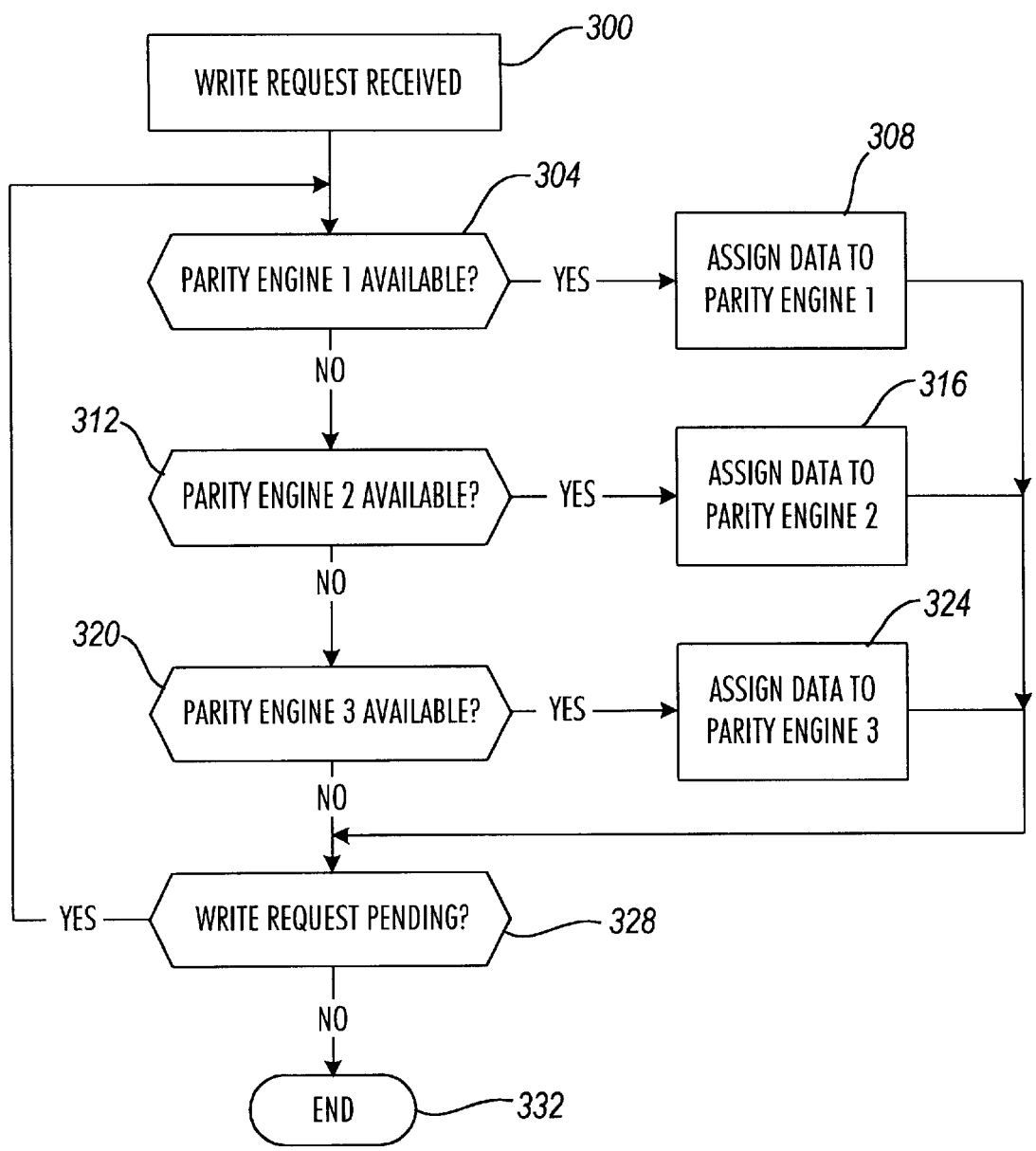
FIG. 3 is a flow chart illustrating the operation of a memory controller processor in accordance with an embodiment of the present invention.

With reference now to FIG. 3, a flow chart illustrating aspects of the operation of a controller 200 in accordance with an embodiment of the present invention is illustrated. In particular, an algorithm that may be implemented by software or firmware running on the processor 228 to allocate write requests received at the channels 204 to the parity engines 216 is depicted. Initially, at step 300, a write request is received. The write request may be received at any one of the channels 204. At step 304, a determination is made as to whether parity engine 1 216a is available. If parity engine 1 216a is available, the data is assigned to parity engine 1 216a (step 308). In general, the assignment of data included in a write request to a particular parity engine 216 is accomplished by passing the address of the assigned parity engine 216 to the channel 204 processing the pending write request. More particularly, the processor 228 formats a command containing the parity engine 216 assignment, and addresses the command to the channel 204 processing the pending write request. The formatted command is placed on the signal line 232, and routed by the switch 212 to the applicable channel 204.

If parity engine 1 216a is not available, a check is made to determine whether parity engine 2 216b is available (step 312). If parity engine 2 216b is available, the data in the pending write request is assigned to parity engine 2 216b (step 316). If parity engine 2 216b is not available, a determination is made as to whether parity engine 3 216c is available (step 320). If parity engine 3 216c is available, the data in the pending write request is assigned to parity engine 3 216c (step 324).

If parity engine 3 is not available, or after data in a write request has been assigned to any of the parity engines 216, a determination is made as to whether further write requests are pending (step 328). If write requests remain pending, the system returns to step 304 to continue allocating data associated with the remaining write request or requests among the parity engines 216. Alternatively, if no write requests remain pending, the write request loop is exited (step 332).

From the above description, it can be appreciated that pending write requests are allocated among the parity engines 216 as the parity engines 216 become available. In this way, the parity engines 216 can work in parallel to calculate error correction syndrome values. This parallel processing capability allows the memory controller 200 of the present invention to offer improved performance as compared to conventional memory controllers 100 by reducing or eliminating the period of latency encountered in conventional controllers 100, when multiple write operations, or write operations containing large amounts of data, are received.

Figure 4:
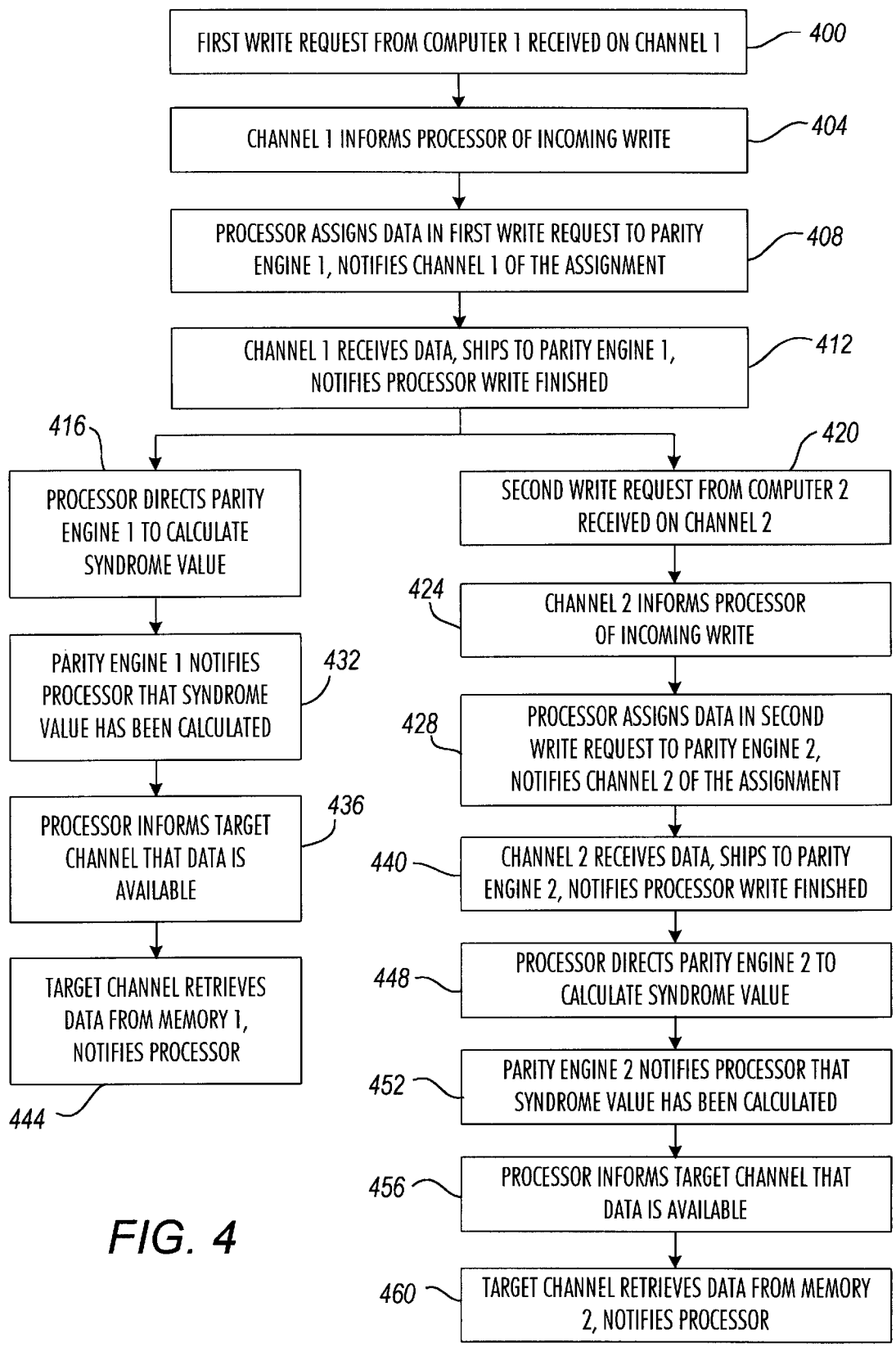
FIG. 4 is a flow chart illustrating the operation of a RAID controller in accordance with an embodiment of the present invention in the context of an example.

With reference now to FIG. 4, a flow chart illustrating the operation of a memory controller 200 in accordance with the present invention is illustrated in the context of an example. Initially, at step 400, a first write request is received from a first computer interconnected to the controller 200 through channel 1 204a. For instance, in the present example, channel 1 204a may be interconnected to the first computer over a small computer system interface (SCSI) bus or other communication channel. At step 404, channel 1 204a informs the processor 228 of the incoming write operation. The processor 228 then assigns the data associated with the first write request to parity engine 1 216a, and notifies channel 1 204a of the assignment (step 408). As mentioned above, the processor 228 may provide notification of the assignment to channel 1 204a by forming a data packet containing the notification, and addressing the data packet to channel 1 204a, such that the switch 212 can route the data packet to channel 1 204a over signal line 208a.

At step 412, channel 1 204a receives a block of the data associated with the first write request from the first computer, ships that data to parity engine 1 216a, and notifies the processor 228 that the write has been completed. In particular, channel 1 204a addresses the data received from the first computer such that the switch 212 can route the data to parity engine 1 216a. When the write is complete, channel 1 204a so informs the processor 228 by formatting a data packet containing the notification such that the switch 212 can route that data packet to the processor 228.

In response to receiving notification that the write has been completed, the processor 228 directs parity engine 1 216a to calculate an error correction syndrome value for the data (step 416). At about the same time the processor 228 is directing parity engine 1 216a to calculate a syndrome value, a second write request is received from a second computer on channel 2 204b (step 420). Channel 2 204b will inform the processor 228 of the incoming write (step 424). Seeing that parity engine 1 216a is not available, the processor 228 assigns the data associated with the second write to parity engine 2 216b, and notifies channel 2 204b of the assignment (step 428).

At about the same time the processor 228 is assigning data to parity engine 2 216b, parity engine 1 216a notifies the processor 228 that a syndrome value has been calculated for the data that it received (step 432). The processor 228 may then inform the target channel, for example, channel 3 204c, that the data associated with the first write operation is available (step 436).

In connection with the second write request, channel 2 204b receives a first block of the associated data, ships that data to parity engine 2 216b, and notifies the processor 228 when the write to parity engine 2 216b is finished (step 440).

At about the same time that the data associated with the second write request is being shipped to parity engine 2 216b, channel 3 204c is retrieving the data associated with the first write operation from memory 1 220a. When the retrieval of that data is completed, channel 3 204c so notifies the processor 228 (step 444). It should be appreciated that the target channel (in the present example, channel 3 204c) may be retrieving data from memory 1 220a at the same time that data is being shipped to parity engine 2 216b. That is, the switched fabric architecture of the controller 200 allows such operations to be conducted simultaneously, instead of in serial fashion, such as when a bus type architecture is used.

At step 448, the processor 228 directs parity engine 2 216b to calculate a syndrome value for the data that it has received. Parity engine 2 216b notifies the processor 228 that a syndrome value has been calculated when that operation is completed (step 452). The processor 228 may then inform the target channel (for example, channel 4 204d) that the data and associated error correction syndrome value in connection with the second write request are available (step 456). Channel 4 204d may then retrieve the data from memory 220b, and notify the processor 220a when that operation has been completed (step 460).

Although the above example has illustrated the receipt of two separate write requests at two separate channels, it should be appreciated that the write requests need not have been received on separate channels. Furthermore, the data associated with a single write request could have been distributed among more than one parity engine 216. For example, if more than one data block was included in the data associated with the first write request, a first block of data could be assigned to parity engine 1 216a, a second block to 216b, and a third block to 216c. In this way, the calculation of error correction syndrome values can be conducted in parallel, again reducing the time required to process write operations.

In a typical implementation, the RAID controller 200 of the present invention is interconnected to a computer system or systems through at least one of the provided channels 204 (e.g., channel 1 204a). The controller 200 will typically be provided in connection with an array of hard disk drives, and will be interconnected to the hard disk drives through at least one of the other provided channels 204 (e.g., channel 2 204b, channel 3 204c, channel 4 204d, or channel 5 204e). A channel 204 used to interconnect the controller 200 to the computer system may accordingly comprise a small computer system interface (SCSI) bus interface or some other interface adapted for use in connection with passing data to and from a computer system. A channel 204 used to interconnect the controller 200 to a storage device or devices will typically provide an input/output bus interface, such as a serial advanced technology attachment (SATA), an SCSI, or an integrated drive electronics (IDE) interface. Furthermore, it should be appreciated that the channels 204 may each support a different one or subset of the input/output interfaces provided by the controller 200.

Additionally, it should be appreciated that, in implementing a RAID system, such as a RAID 5 system, the controller 200 may appropriately distribute the data to be written to the storage devices by assigning the distributed portions of data to different channels 204 for storage on devices associated therewith. Alternatively or in addition, multiple storage devices may be associated with a single channel 204, and the data may be addressed to a single channel, and sub-addressed to particular devices associated with the channel 204 to achieve the desired data distribution. In still a further embodiment, the disclosed controller 200 may function to calculate error correction syndrome values, and allow an additional controller or controllers to distribute the data and associated error correction syndrome values among storage devices.

The switched fabric architecture utilized by the controller may be, for example, the INFINIBAND™ architecture, or the RapidIO™ interconnect architecture. However, any system for providing a switched fabric architecture may be used.

The controller 200 may be implemented as a controller card that may be included as part of a disk array stack or as a card that is interconnected to a host system bus. Additionally, all or a majority of the components may be implemented in a single integrated circuit.

Although the description of the present invention set forth herein has referred to a RAID 5 controller, it will be appreciated by one of skill in the art that the present invention may also be beneficially applied in connection with any RAID scheme using error correction code, such as RAID 3, RAID 4 and RAID 6. Furthermore, although the memory controller of the present invention is particularly useful in connection with the control of RAID storage systems using error correction code, its application is not so limited. For example, the present invention may be used in connection with general memory controllers, bridges between communication buses, and any device controller utilizing cache memory in connection with error correction code. Furthermore, it will be appreciated that the cache memory 220 of the present invention can be any type of rewritable memory, including DRAM, RAM, SDRAM and SRAM.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A scalable method for reducing latency associated with computer data parity calculations, comprising:
    interconnecting a first interface to a first parity engine and to a second parity engine; and
    interconnecting a second interface to said first parity engine and to said second parity engine, wherein a parity calculation for a first block of data delivered from said first interface to said first parity engine can be performed while a parity calculation for a second block of data delivered from at least one of said first interface and said second interface to said second parity engine is performed, and wherein at least a portion of said first block of data is delivered from said first interface to said first parity engine while at least a portion of said second block of data is delivered from said second interface to said second parity engine.

2. The method of claim 1, further comprising:
    interconnecting said first and second interfaces to a third parity engine, wherein said first, second, and third parity engines are capable of performing parity calculations on provided blocks of data simultaneously.

3. The method of claim 1, wherein said first and second interfaces are interconnected to said first and second parity engines through a switch.

4. The method of claim 3, wherein said switch and said interconnections between said interfaces and said parity engines form a switched fabric architecture.

5. The method of claim 1, wherein an assignment of data from said at least one of said first and said second interfaces to said first or second parity engines is made by a processor.

6. The method of claim 1, wherein said first interface is interconnected to a computer, and wherein said second interface is interconnected to a data storage device.

7. The method of claim 1, further comprising storing at least one of said first and said second blocks of data and a corresponding error correction syndrome value on a data storage device interconnected to at least one said first and second interfaces.

8. The method of claim 1, wherein said parity calculations are made in connection with a transfer of data from a computer interconnected to at least one of said first and second interfaces to an array of storage devices interconnected to at least one of said first and second interfaces.

9. The method of claim 1, wherein said parity calculation for said first block of data comprises a 512 byte block of data.

10. A method for providing parity calculations in connection with computer memory, comprising:

receiving a first block of data at an interface;

delivering said first block of data to a first of a plurality of parity engines;

receiving a second block of data at an interface; and delivering said second block of data to a second of a plurality of parity engines, wherein at least a portion of said first block of data is delivered to said first parity engine while at least a portion of said second block of data is delivered to said second parity engine, and wherein a parity calculation can be made in connection with said first block of data while a parity calculation in connection with said second block of data is made.

11. The method of claim 10, wherein said first and second blocks of data are received at at least one of first and second interfaces, and further comprising directing said first block of data to a one of said at least first and second interfaces following completion of said parity calculation in connection with said first block of data.

12. The method of claim 11, further comprising directing said second block of data to a one of said at least first and second interfaces following completion of said parity calculation in connection with said second block of data.

13. The method of claim 10, wherein said step of directing said first block of data comprises providing said interface with an address for said first of a plurality of parity engines.

14. The method of claim 10, wherein said parity engine comprises an XOR engine.

15. The method of claim 10, wherein said first block of data is received from a server.

16. The method of claim 10, wherein said first block of data is received from a host computer.

17. The method of claim 11, wherein said second interface is interconnected to a storage device.

18. A RAID controller, comprising:

a first interface;

a plurality of parity engines, each having an associated memory cache;

a switch for selectively interconnecting said first interface to a one of said plurality of parity engines, wherein a first block of data received at said first interface is provided by said switch to a first of said plurality of parity engines, and wherein a second block of data received at said first interface is provided by said switch to a second of said plurality of parity engines.

19. The RAID controller of claim 18, further comprising a second interface, wherein said switch is capable of selectively interconnecting said second interface to a one of said plurality of parity engines.

20. The RAID controller of claim 18, further comprising a processor, wherein said processor provides said first interface with a first address for said first block of data, wherein said switch directs said first block of data to a one of said plurality of parity engines having said first address, and wherein said processor provides said first interface with a second address for said second block of data, and wherein said switch directs said second block of data to a one of said plurality of parity engines having said second address.

21. The RAID controller of claim 18, wherein said switch interconnects said first interface and said plurality of parity engines so as to form a switched fabric architecture.

* * * * *